(12) United States Patent
Pichler et al.

(10) Patent No.: US 11,556,751 B2
(45) Date of Patent: Jan. 17, 2023

(54) RFID TAG LIMITER

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,487

(22) Filed: May 29, 2021

(65) Prior Publication Data

US 2022/0383060 A1 Dec. 1, 2022

(51) Int. Cl.
*G06K 19/07* (2006.01)
*G06K 19/073* (2006.01)

(52) U.S. Cl.
CPC ..... *G06K 19/0715* (2013.01); *G06K 19/0712* (2013.01); *G06K 19/0723* (2013.01); *G06K 19/07372* (2013.01)

(58) Field of Classification Search
CPC ........... G06K 19/0715; G06K 19/0712; G06K 19/0723; G06K 19/07372
USPC .......................................................... 235/492
See application file for complete search history.

(56) References Cited

U.S. PATENT DOCUMENTS

| | | | |
|---|---|---|---|
| 7,158,009 B2 | 1/2007 | Watanabe | |
| 7,259,612 B2 | 8/2007 | Saether | |
| 7,439,860 B2 | 10/2008 | Andresky | |
| 7,688,122 B2 | 3/2010 | Nedovic | |
| 7,795,966 B2* | 9/2010 | Wyse | H03F 3/24 330/207 P |
| 7,944,279 B1 | 5/2011 | El Waffaoui | |
| 8,500,033 B2 | 8/2013 | Almond et al. | |
| 8,687,395 B2 | 4/2014 | El Waffaoui | |
| 9,030,297 B2 | 5/2015 | Hill | |
| 9,471,816 B1 | 10/2016 | Hyde et al. | |
| 9,594,997 B1* | 3/2017 | Buescher | G06K 19/0723 |
| 9,762,282 B1 | 9/2017 | Muellner | |
| 9,997,928 B2 | 6/2018 | Petersen et al. | |
| 10,211,825 B2 | 2/2019 | Bellaouar | |
| 10,587,110 B2 | 3/2020 | Malinowski | |
| 2004/0212503 A1 | 10/2004 | Stilp | |
| 2007/0257800 A1 | 11/2007 | Yang et al. | |
| 2010/0019907 A1 | 1/2010 | Shanks | |
| 2010/0253315 A1 | 10/2010 | Nehrig et al. | |
| 2011/0115540 A1* | 5/2011 | Kamp | G08B 13/06 327/321 |
| 2015/0129666 A1 | 5/2015 | Butler et al. | |

(Continued)

FOREIGN PATENT DOCUMENTS

CN 104052415 A 9/2014
EP 2487993 A2 8/2012

OTHER PUBLICATIONS

U.S. Appl. No. 17/247,650, filed Dec. 18, 2020, entitled: Dual System RFID Tag. The Examiner is referred to the copending patent prosecution of the common Applicant (no attachment).

(Continued)

*Primary Examiner* — Michael G Lee
*Assistant Examiner* — David Tardif

(57) ABSTRACT

A Radio Frequency Identification (RFID) tag is disclosed. The RFID tag includes an antenna port to receive an input AC signal and a hybrid limiter including a clamping device configured to limit a voltage of the input AC signal to a preconfigured limit. The hybrid limiter is configured to provide a stable ground reference for the clamping device.

14 Claims, 1 Drawing Sheet

(56) References Cited

U.S. PATENT DOCUMENTS

| | | |
|---|---|---|
| 2015/0227832 A1 | 8/2015 | Diorio et al. |
| 2016/0087430 A1 | 3/2016 | Sheikholeslami |
| 2016/0180123 A1 | 6/2016 | Forster |
| 2017/0104408 A1 | 4/2017 | Rebollo et al. |
| 2017/0324385 A1 | 11/2017 | McKay |
| 2018/0069433 A1 | 3/2018 | Lin et al. |
| 2018/0287508 A1 | 10/2018 | Nakamura |

OTHER PUBLICATIONS

U.S. Appl. No. 17/303,488, filed May 29, 2021, entitled: RFID Tag Self Tuning. The Examiner is referred to the copending patent prosecution of the common Applicant (no attachment).

U.S. Appl. No. 17/303,485, filed May 29, 2021, entitled: Self Limiting Charge Pump. The Examiner is referred to the copending patent prosecution of the common Applicant (no attachment).

Non-Final Office Action dated Feb. 17, 2022 for U.S. Appl. No. 17/303,485, 15 Pages.

Notice of Allowance dated Mar. 11, 2022 for U.S. Appl. No. 17/303,488; 22 Pages.

Notice of Allowance dated May 18, 2022 for U.S. Appl. No. 17/303,485, 13 Pages.

\* cited by examiner

RFID TAG LIMITER

BACKGROUND

Radio Frequency Identification (RFID) refers to a wireless system comprised of two components: tags and readers. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. Near Field Communication (NFC) is a wireless communication technology that acts over short distances for two-way communication. The use of NFC tags is growing in several markets, including the medical, consumer, retail, industrial, automotive, and smart grid markets. NFC is a type of RFID technology. Due to internal or external factors such as distance from the other device or tag, nearby objects, etc. the tag needs to be tuned to balance the impedance to optimize the received signal strength before a data read cycle starts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a Radio Frequency Identification (RFID) tag is disclosed. The RFID tag includes an antenna port to receive an input AC signal and a hybrid limiter including a clamping device configured to limit the voltage of the input AC signal to a preconfigured limit. The hybrid limiter is configured to provide a stable ground reference for the clamping device. In some examples, the RFID tag includes an interface port and a ground port.

In some examples, the clamping device includes a first transistor and a second transistor coupled between terminals of the antenna port. The first transistor and the second transistor are of type NMOS. The RFID tag further includes a third transistor coupled between a first terminal of the antenna port and a ground. The third transistor is smaller in physical size than the first transistor. The RFID tag includes a fourth transistor coupled between a second terminal of the antenna port and a ground. The fourth transistor is smaller in physical size than the second transistor. The gate of the first transistor and the gate of the third transistor are driven by a same gate voltage ($V_G$). The gate of the first transistor and gate of the fourth transistor are driven by the same gate voltage ($V_G$) that may be derived from the signal at the antenna port using a rectifier circuit. In some examples, a ground switch may be used to implement the ground reference.

In another embodiment, a tamper detection system is disclosed. The tamper detection system includes a RFID tag, an interface port and a ground port. The RFID tag includes an antenna port to receive an input AC signal, and a hybrid limiter including a clamping device configured to limit the voltage of the input AC signal to a preconfigured limit. The hybrid limiter is configured to provide a stable ground reference for the clamping device. In some examples, the RFID tag is configured to detect tampering by sensing ground at the interface port. The RFID tag is configured to transmit an indication of the tampering to an external reader when no ground is sensed at the interface port. The RFID tag may include a control logic configured to sense the ground at the interface port and to transmit the indication to the external reader via the antenna coupled with the antenna port. The hybrid limiter includes a first transistor and a second transistor to provide a voltage clamp and a third transistor and a fourth transistor to provide a ground reference for the voltage clamp.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
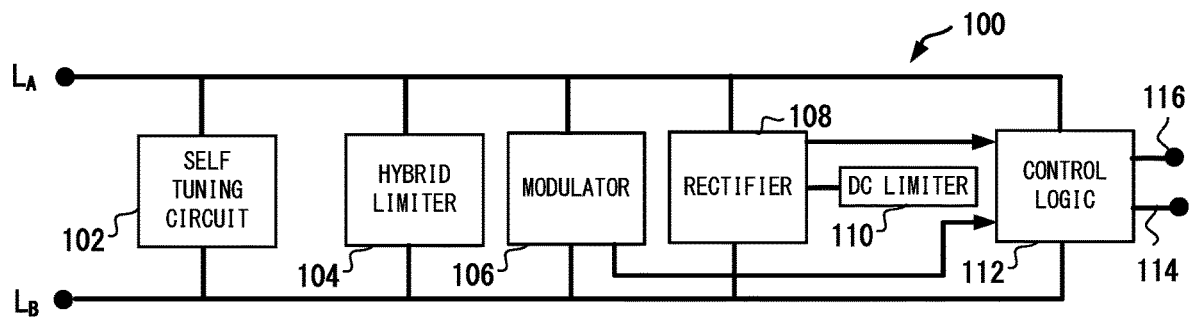
FIG. 1 shows a block diagram of a RFID tag in accordance with one or more embodiments of the present disclosure.

Note that figures are not drawn to scale. Not all components of the RFID tag are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

RFID tags can store a range of information from one serial number to several pages of data. RFID tags can be mobile so that they can be carried by hand, or they can be mounted on a post or overhead. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least of them has to be an active device (powered). In many cases, this would be a smartphone, tablet, security pad, or a payment terminal. The other device can be either active or passive (unpowered). Using NFC, two devices can be set up in less than one-tenth of a second.

In an active peer-to-peer (P2P) mode, two active devices create a wireless communication channel between them. The active device, with an external power supply, can power the passive device with the electromagnetic field coming from the active device. U.S. Pat. No. 9,997,928 entitled "self-tuning resonant power transfer systems" by Petersen describes tuning a wireless power transfer system, which is incorporated herein by reference. U.S. Pat. No. 8,836,512 entitled "Self tuning RFID" by Shanks describes the self-tuning of RFID tag, which is incorporated herein by reference. The self-tuning of the RFID tag ensures optimal power transfer from the active device to the RFID tag so that the RFID tag can use the received energy to transfer data back to the active device. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices. It operates at the 13.56 MHz frequency, which is a license-free section of HF on the RF spectrum.

The strength of the received signal may be dependent on the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal.

In some RFID applications, such as tamper detection application or any other application in which a stable ground is needed, some internal circuits such as a limiter needs to be ground tolerant to make the operations that depend on a stable ground possible.

FIG. 1 shows a schematic of an embodiment of an RFID tag 100 that includes an antenna port including pins to receive $L_A$ and $L_B$ inputs from an antenna. In some examples, the antenna port may be configured to receive signals via a wire coil type antenna. The RFID tag 100, which may be incorporated in an integrated circuit (IC) and may include a self-tuning circuit 102, an hybrid limiter 104, a modulator 106 and a control logic 110. In some examples, the self-tuning circuit 102 may be optional. The modulator 106 may be configured to encode the RFID tag interrogation request in a signal form and modulating the signal and transfer the signal to the control logic 112. The control logic 112 may include data that the control logic 110 may transmit back in the response to the interrogation request. The control logic 112 may be configured for an application such as a tamper detection system. A rectifier 108 may be included to convert the signal between $L_A$ and $L_B$ into a DC signal which may be inputted to the control logic 112. Optionally, a DC limiter 110 may be included to limit the output DC voltage level of the rectifier 108 to a preconfigured voltage level. The hybrid limiter 104 is included to provide electrostatic discharge (ESD) protection and to limit the input signal voltage to a preconfigured voltage level to protect the downstream circuit in the RFID tag 100. In one embodiment, as shown in FIG. 1, the RFID tag 100 includes an interface port 116 (e.g., I2C port) and a ground port 114.

Typical implementations of the limiter may include a transistor pair coupled between $L_A$ and $L_B$. While these implementations may be optimized for the area on the silicon, these implementations do not provide a ground tolerance that may be needed in some applications of the RFID tag 100. The typical implementations are susceptible to ground changes that can be triggered by touching external interfaces (e.g. the interface port 116). In case of such a ground change, the reference of the gate voltage $V_G$ varies and this variation leads to a change in the clamping voltage. Under certain conditions, like modulation, the change in clamping voltage may lead to a loss of the function of the RFID tag 100.

Figure 2:
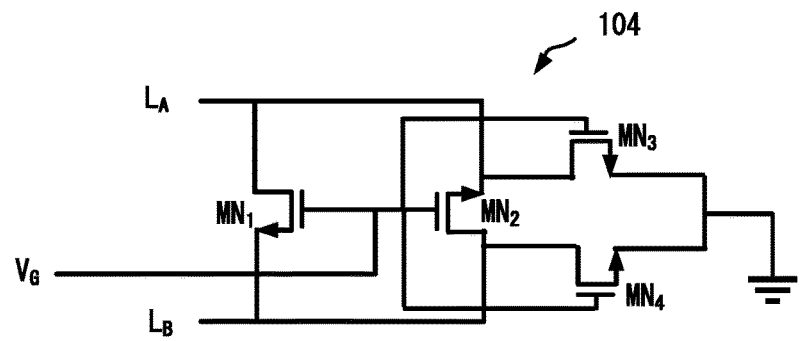
FIG. 2 depicts an hybrid limiter circuit used in the RFID tag in accordance with one or more embodiments of the present disclosure.

FIG. 2 depicts the internal circuit of the hybrid limiter 104. The hybrid limiter 104 limits both AC and DC voltages. The hybrid limiter 104 includes transistors $MN_1$ and $MN_2$ coupled in parallel between $L_A$ and $L_B$. The gates of the transistors $MN_1$ and $MN_2$ are coupled together and are driven by a same gate voltage $V_G$ that may be derived from the input AC signal at $L_A/L_B$. The transistors $MN_1$, $MN_2$ may be NMOS transistors in one example, to save the area on the silicon. A transistor $MN_3$ is coupled between $L_A$ and ground and a transistor $MN_4$ is coupled between $L_B$ and ground. In some examples, the hybrid limiter 104 may use a ground switch to implement a local ground connection. An example implementation of a ground switch is disclosed by U.S. application Ser. No. 17/247,997 filed on Jan. 4, 2021 entitled "IMPROVED GROUND SWITCH", which is described herein by reference. Transistors $MN_3$ and $MN_4$ may be of type NMOS and the transistors $MN_3$ and $MN_4$ are smaller in size compared to transistors $MN_1$ or $MN_2$. It should be noted that a PMOS transistor takes more space on the silicon, hence transistors of type PMOS may not be suitable for the hybrid limiter 104. The physical size of the transistors $MN_3$ and $MN_4$ is kept smaller than the physical size of the transistor $MN_1$ so that transistors $MN_3$ and $MN_4$ do not introduce substantial amount of parasitic capacitance. The gates of the transistors $MN_3$ and $MN_4$ are coupled with the gates of the transistors $MN_1$ and $MN_2$.

Transistors $MN_1$ and $MN_2$ limits or clamps the voltage between the two antenna terminals $L_A$ and $L_B$. To prevent the impact of the shift in the ground potential on the limiter function, transistors $MN_3$ and $MN_4$ are included to generate ground reference for the transistors $MN_1$ and $MN_2$. The transistors $MN_3$ and $MN_4$ defines a local ground reference for the hybrid limiter 104 only, hence, the power requirements for the transistors $MN_3$ and $MN_4$ may be small, hence a smaller physical size of the transistors $MN_3$ and $MN_4$ may be used. The gates of the transistors $MN_1$, $MN_2$, $MN_3$ and $MN_4$ are given by the gate voltage $V_G$, which may be provided by the logic control 114 in one example or may be derived from the output of the rectifier 108.

Figure 3:
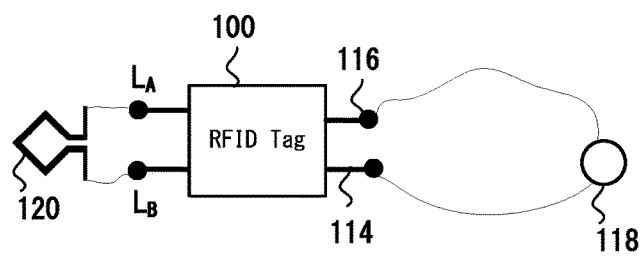
FIG. 3 shows a tamper protection system using the RFID tag in accordance with one or more embodiments of the present disclosure.

FIG. 3 shows an example of a tamper detection system that includes the RFID tag 100 and an antenna 120 coupled between the antenna terminals $L_A/L_B$. The RFID tag 100 may be affixed to a product 118 to detect a tampering. The product 118 may be coupled between the interface port 116 and the ground port 114. The control logic 112 may be configured to detect ground on the interface port 116. If the link between the interface port 116 or the ground port 114 and the product 118 is broken or tampered with (e.g., if the product 118 is opened thus breaking the wire between the interface port 116 or the ground port 114 and the product 118). Upon detection of the tampering, the RFID tag 100 is configured to send a tamper indication to a RFID reader when the RFID tag 100 is interrogated.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A Radio Frequency Identification (RFID) tag, comprising:
   an antenna port having first and second input terminals to receive an input AC signal; and
   a hybrid limiter including a clamping device having a first transistor and a second transistor coupled in parallel between the first and second input terminals, the clamping device configured to limit a voltage of the input AC signal to a preconfigured limit, a third transistor coupled between the first input terminal and a ground terminal, and a fourth transistor coupled between the second input terminal and the ground terminal, wherein a gate of each of the first, second, third, and fourth transistors are coupled together to receive a gate voltage,
   wherein the third and fourth transistors of the hybrid limiter are configured to provide a stable ground reference for the first and second transistors of the clamping device.

2. The RFID tag of claim 1, further including an interface port and a ground port.

3. The RFID tag of claim 2, wherein the first transistor and the second transistor are of type NMOS.

4. The RFID tag of claim 1, wherein the third transistor is smaller in physical size than the first transistor.

5. The RFID tag of claim 1, wherein the fourth transistor is smaller in physical size than the second transistor.

6. The RFID tag of claim 4, wherein a gate of the first transistor and a gate of the third transistor are driven by a same gate voltage.

7. The RFID tag of claim 5, wherein a gate of the first transistor and a gate of the fourth transistor are driven by a same gate voltage.

8. The RFID tag of claim 4, wherein the ground is coupled to a ground switch.

9. The RFID tag of claim 1, further including a self-tuning circuit coupled with the antenna port to optimize signal strength of the input AC signal during a self-tuning phase.

10. A tamper detection system, comprising:
    a Radio Frequency Identification (RFID) tag, wherein the RFID tag includes an antenna port having first and second input terminals to receive an input AC signal and a hybrid limiter including a clamping device configured to limit a voltage of the input AC signal voltage to a preconfigured limit, the clamping device having a first transistor and a second transistor coupled in parallel between the first and second input terminals, a third transistor coupled between the first input terminal and a ground terminal, and a fourth transistor coupled between the second input terminal and the ground terminal, wherein a gate of each of the first, second, third, and fourth transistors are coupled together to receive a gate voltage, and wherein the third and fourth transistors of the hybrid limiter are configured to provide a stable ground reference for the first and second transistors of the clamping device;

an antenna coupled with the antenna port;

an interface port; and a ground port.

11. The tamper detection system of claim 10, wherein the RFID tag is configured to detect tampering by sensing ground at the interface port.

12. The tamper detection system of claim 11, wherein the RFID tag is configured to transmit an indication of the tampering to an external reader when no ground is sensed at the interface port.

13. The tamper detection system of claim 12, further including a control logic configured to sense the ground at the interface port and to transmit the indication to the external reader via the antenna.

14. The tamper detection system of claim 10, wherein the RFID tag further includes a self-tuning circuit coupled with the antenna port to optimize signal strength of the input AC signal during a self-tuning phase.

* * * * *